(12) United States Patent
Shin et al.

(10) Patent No.: US 8,140,999 B2
(45) Date of Patent: Mar. 20, 2012

(54) DISPLAY PROCESS DEVICE AND DISPLAY PROCESS METHOD

(75) Inventors: Hidehiko Shin, Osaka (JP); Hideaki Yajima, Osaka (JP)

(73) Assignee: Panasonic Corporation, Osaka (JP)

( * ) Notice: Subject to any disclaimer, the term of this patent is extended or adjusted under 35 U.S.C. 154(b) by 91 days.

(21) Appl. No.: 10/590,339

(22) Filed: Aug. 23, 2006

(65) Prior Publication Data

US 2007/0174767 A1    Jul. 26, 2007

(30) Foreign Application Priority Data

Mar. 26, 2004   (JP) .................................. 2004-091443

(51) Int. Cl.
*G06F 3/048*   (2006.01)
*G06F 15/16*   (2006.01)

(52) U.S. Cl. ......... 715/825; 715/810; 715/746; 709/246
(58) Field of Classification Search .................. 715/825, 715/400, 746, 810; 709/246
See application file for complete search history.

(56) References Cited

U.S. PATENT DOCUMENTS

| | | | | |
|---|---|---|---|---|
| 5,801,696 A | * | 9/1998 | Roberts | 715/781 |
| 6,496,202 B1 | * | 12/2002 | Prinzing | 715/762 |
| 6,959,340 B1 | * | 10/2005 | Najmi | 709/246 |
| 7,030,890 B1 | * | 4/2006 | Jouet et al. | 345/619 |
| 7,436,346 B2 | * | 10/2008 | Walter et al. | 341/176 |
| 2003/0011633 A1 | * | 1/2003 | Conley et al. | 345/762 |
| 2004/0176967 A1 | * | 9/2004 | Whittenberger | 705/1 |
| 2009/0239587 A1 | * | 9/2009 | Negron et al. | 455/566 |

FOREIGN PATENT DOCUMENTS

| | | |
|---|---|---|
| JP | 9-134267 | 5/1997 |
| JP | 9-506191 | 6/1997 |
| JP | 11-102289 | 4/1999 |
| WO | 95/12161 | 5/1995 |

OTHER PUBLICATIONS

"Design Patterns for Object-Oriented Software Development" by Wolfgang Pree, Toppan, 1996.
"Design Patterns: Elements of Reusable Object-Oriented Software" by Erich Gamma et al., Softbank, 1995.
Akira Tokunaga, A Study of GUI Program Development Environment, The Institute of Electronics, Information and Communication Engineers, Technical Report of IEICE, SSE 92-84, Nov. 26, 1992, vol. 92, No. 348, pp. 7-11 (with English Translation).

* cited by examiner

*Primary Examiner* — William Bashore
*Assistant Examiner* — David Phantana Angkool
(74) *Attorney, Agent, or Firm* — Wenderoth Lind & Ponack, L.L.P.

(57) ABSTRACT

A display process device that includes a screen definition information interpretation section that interprets screen definition information which defines a moment in which a first screen event is to be issued, and issues a first screen event. The first screen event is for executing an action, and corresponds to an instruction inputted from an input I/F section. A first event conversion section converts the first screen event to a first device event which may be interpreted by a device resource control section. The device resource control section controls a device resource in accordance with the first device event. Also, the device resource control section issues a second device event having described thereon a result of referencing and modifying a device resource. A second event conversion section converts the second device event to a second screen event which may be interpreted by a screen definition information interpretation section.

5 Claims, 11 Drawing Sheets

FIG. 1A

PRIOR ART

501 action://dispGuide?arrow=right+left&function=subMenu

SCHEMA | INSTRUCTION NAME | ATTRIBUTE | VALUE | ATTRIBUTE | VALUE

502

| URL ISSUED BY FLASH PLAYER (AN EXAMPLE OF FIRST SCREEN EVENT ISSUED FROM SCREEN DEFINITION INFORMATION INTERPRETATION SECTION) | AN EXAMPLE OF ACTION TAKEN BY DEVICE RESOURCE CONTROL SECTION |
|---|---|
| action://dispGuide?arrow= (right \| left \| up \| down) | - A RIGHT ARROW IS DISPLAYED WHEN 'right' IS SELECTED<br>- A LEFT ARROW IS DISPLAYED WHEN 'left' IS SELECTED<br>- AN UP ARROW IS DISPLAYED WHEN 'up' IS SELECTED<br>- A DOWN ARROW IS DISPLAYED WHEN 'down' IS SELECTED |
| action://dispGuide?function= (subMenu \| back) | - A CHARACTER STRING "SUB MENU" IS DISPLAYED WHEN 'subMenu' IS SELECTED<br>- A CHARACTER STRING "RETURN" IS DISPLAYED WHEN 'return' IS SELECTED |

Anchor{
    url"http://www.school.edu/vrml/someScene.wrl#OverView"
    children Shape{geometry Box{}}
}

FIG. 6A

```
#   CHARACTER STRING/NUMERICAL VALUE CONVERSION
                     ID              ID
#CLASSIFICATION  (NUMERICAL VALUE)  (CHARACTER STRING)  i d
    id,          105,               logicFirst
    id,          1000,              logicShowScreen
    id,          0,                 BrowseParam

#   EVENT CONVERSION
                     ID           PSEUDO EVENT      ISSUANCE
#CLASSIFICATION  (NUMERICAL VALUE) CLASSIFICATION   POINT
    ievent,      1000,            KeyPress          1
    ievent,      1006,            KeyPress          0
    ievent,      1008,            mouseDown         -10, -15
```

FIG. 6B

| INCOMING CALL |  |
|---|---|
| MENU<br>DISPLAY SETTING FOR CALL TIME | |
| SILENT TIME | 05 SECOND |
| UNANSWERED<br>INCOMING CALL<br>DURING SILENT TIME | DISPLAY |

DISPLAY PROCESS DEVICE AND DISPLAY PROCESS METHOD

TECHNICAL FIELD

The present invention relates to a display process device and a display process method thereof, and more particularly to a display process device having applied thereon an application framework technique so as to efficiently achieve a modification of a graphical user interface (GUI) in a field of application development, and a display process method thereof.

BACKGROUND ART

An application framework is a software template having a common structure of applications in an area of a specific concern. An application developer is, by utilizing the application framework, able to improve efficiency for developing an application. Also, a desired application may be developed even more efficiently if the developer reconstructs an existing application framework. The technical foundation for the application framework is disclosed in detail in non-patent document 1 and non-patent document 2. An application framework technique is usable in a general development for an object-oriented software; there are numerous application frameworks available for various areas of concern.

As for a conventional application framework, there is one framework disclosed in patent document 1. According to the conventional application framework, a method and a device are disclosed for dealing with an exchange of graphic data between one application and another, and for developing a graphic application, which includes a framework for displaying and operating a graphical object.

Also, in order for a WEB browser (e.g., Internet Explorer™ of Microsoft Co.), which is used for displaying Internet contents, to display a content having a GUI, which cannot be displayed on the WEB browser, the WEB browser needs a plug-in player (hereinafter, Flash player) so as to reproduce a content (hereinafter, Flash content) which requires, for example, a Macromedia Flash™.

Also, by utilizing a content (hereinafter, GUI content) e.g., Macromedia Flash(trademark) which realizes a GUI of two-dimensionality (e.g., a vector graphics) or three-dimensionality (e.g., a polygon), and the player (hereinafter, a GUI player), for reproducing such GUI content, it becomes possible to realize a GUI that is visually expressive.

[Patent Document 1] Japanese Laid-Open Patent Publication No. 9-506191.
[Non-Patent Document 1] "Design Patterns For Object-Oriented Software Development" by Wolfgang Pree, Toppan, 1996.
[Non-Patent Document 2] "Design Patterns: Elements Of Object-Oriented Software Architecture" by Erich Gamma et al., Softbank, 1995.

However, according to the technique disclosed in the aforementioned Patent Document 1, in order to modify a GUI easily, there is provided a rule for generating a GUI content per GUI. Therefore, there arises a problem in which the GUI content and the GUI player, which are generated specifically for a certain system, cannot be used for developing an application for another system.

Also, in order to use the GUI content for a GUI of an application which is operable in an apparatus, a GUI player for reproducing the GUI content needs to be able to access a resource of the apparatus. However, there arises a problem that, when the existing GUI player is the only option for reproducing the GUI content, the GUI player cannot access any resource of the apparatus other than screen display. Here, what is meant by a resource is a component or data that has been saved in the application other than the GUI player. The problem the current GUI player has is that the GUI player cannot, for example, start another application of the apparatus, use a function retained by another application, and display a key guidance (hereinafter, referred to as guidance display) providing a user, who is next the apparatus, with an optional action.

Therefore, the object of the present invention is to provide a display process device in which a GUI content is reproduced by a GUI player, and the GUI player can access a resource on the apparatus, and a display process method thereof.

SUMMARY OF THE INVENTION

The present invention is directed to a display process device for displaying a screen on a display. In order to achieve the aforementioned object, the display process device of the present invention comprises, as a basic configuration, an information storage section, a screen definition information interpretation section, a first event conversion section, and a device resource control section. A second event conversion section is also comprised in the display process device as an advanced configuration.

The information storage section stores screen definition information, which defines a correlation between a screen, which is displayed on a display, and an action, which corresponds to an instruction indicated on the screen. The screen definition information interpretation section interprets screen definition information, generates a screen to be displayed on the display, and, in accordance with an input of the instruction, issues a first screen event, which is for executing an action, and corresponds to the instruction. The first event conversion section converts the first screen event to a first device event, which may be interpreted and executed by a device resource retained by the display process device. The device resource control section controls, based on the first device event converted by the first event conversion section, the device resource.

The second event conversion section may be used when the device resource control section issues, for a second device event, a result of a screen modification caused by the control of the device resource based on the first device event. In the second event conversion section, the second device event may be converted to a second screen event, which may be interpreted by the screen definition information interpretation section, or may be directly converted to a screen, which is to be displayed on the display. When the former option is chosen, in the screen definition information interpretation section, a modification screen, which will be displayed on the display, is generated based on the second screen event.

Preferably, the configuration of the present device includes a view section, which reports to the first event conversion section the first screen event issued by the screen definition information interpretation section, and reports to the second event conversion section the second device event issued by the device resource control section. Due to such configuration, the screen definition information interpretation section, the first event conversion section, and the second event conversion section are to be updated through the view section. Needles to say, the screen definition information may be replaced through the screen definition information interpretation section.

Each process executed by each component of the aforementioned display process device may be interpreted as a display process method representing a sequence of processes. The method is provided as a program for a computer so as to execute the sequence of the processes. The program may be introduced to the computer in a recorded form contained in a computer readable recording medium.

As stated above, according to the present invention, in the field of an application development, it becomes possible for a GUI content and a GUI player which are generated and developed, respectively, for another system to realize a GUI of an application which is under development, and for the GUI player to have an access to a resource of an apparatus having therein the GUI player.

Further, updating the GUI content and the GUI player allows GUI of an application, which is under development, to be modified without modifying the application. By this, reusability of the application will be improved, thereby realizing an improvement in efficiency of an application development, and a reduction of a cost of the application development.

DESCRIPTION OF THE REFERENCE CHARACTERS 1 screen section
2 control section
3 conversion section
10, 20 display process device
11 information storage section
11a screen definition information
12 screen definition information interpretation section
13 display interface section
14 input interface section
15, 16 event conversion section
17 device resource control section
18 device resource
21 view section
30 display device
40 input device
501, 502 first screen event
800, 810 display screen

DETAILED DESCRIPTION OF THE INVENTION

First, the system concept of the present invention will be described briefly.

Figure 1A:
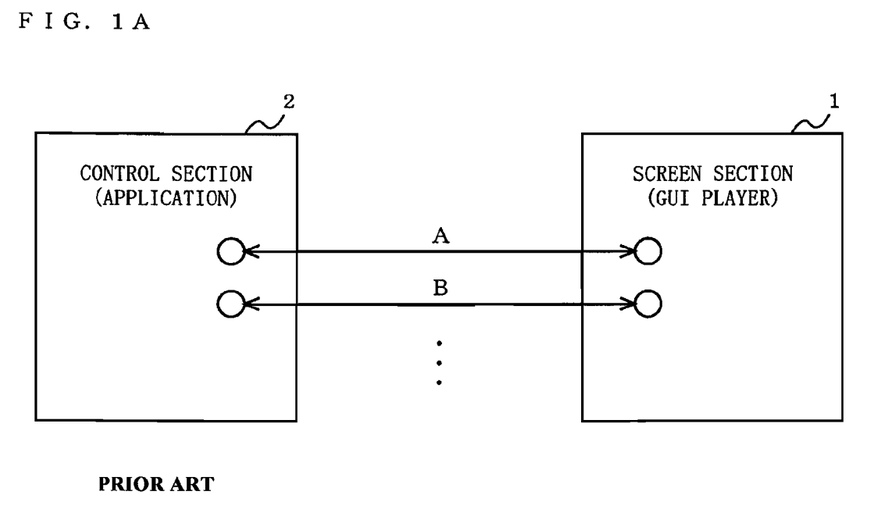
FIG. 1A is a diagram for describing a general concept for a conventional system.

As stated above, conventionally, a screen section 1 (e.g., GUI player) controlled by a designer, and a control section 2 (e.g. application) controlled by a programmer are designed such that the screen section 1 and the control section 2 are mutually constrained by one another (FIG. 1A). Therefore, modifying a design of either one of the screen section or the control section affects a design of the other. This is the reason why either one of the screen section 1 or the control section 2 cannot be easily applied individually to another system.

Figure 1B:
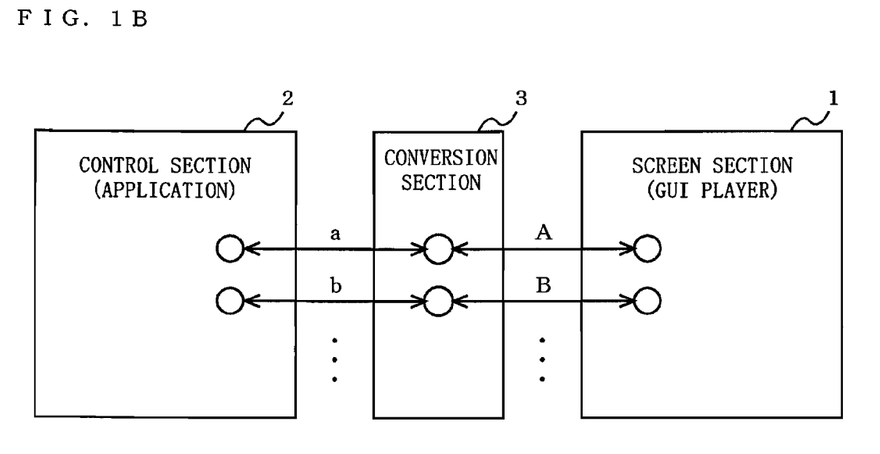
FIG. 1B is a diagram for describing a general concept for a system of the present invention.

On the contrary, according to the present invention, a conversion section 3, which is responsible for converting an event going between the screen section 1 and the control section 2, is provided so that the event is sent to a receiver after the event is converted into a form which is interpretable for the receiver (FIG. 1B). By this, if a conversion rule for the conversion section 3 is pre-set, the designer and the programmer will be able to design freely without being constrained by a design of the other.

Note that, in a description hereinafter, "screen" means an image (displayed object), which is to be displayed on the display part, wherein the image contains a word or/and a figure; not a display part or a display device having a LCD screen.

(First Embodiment)

Figure 2:
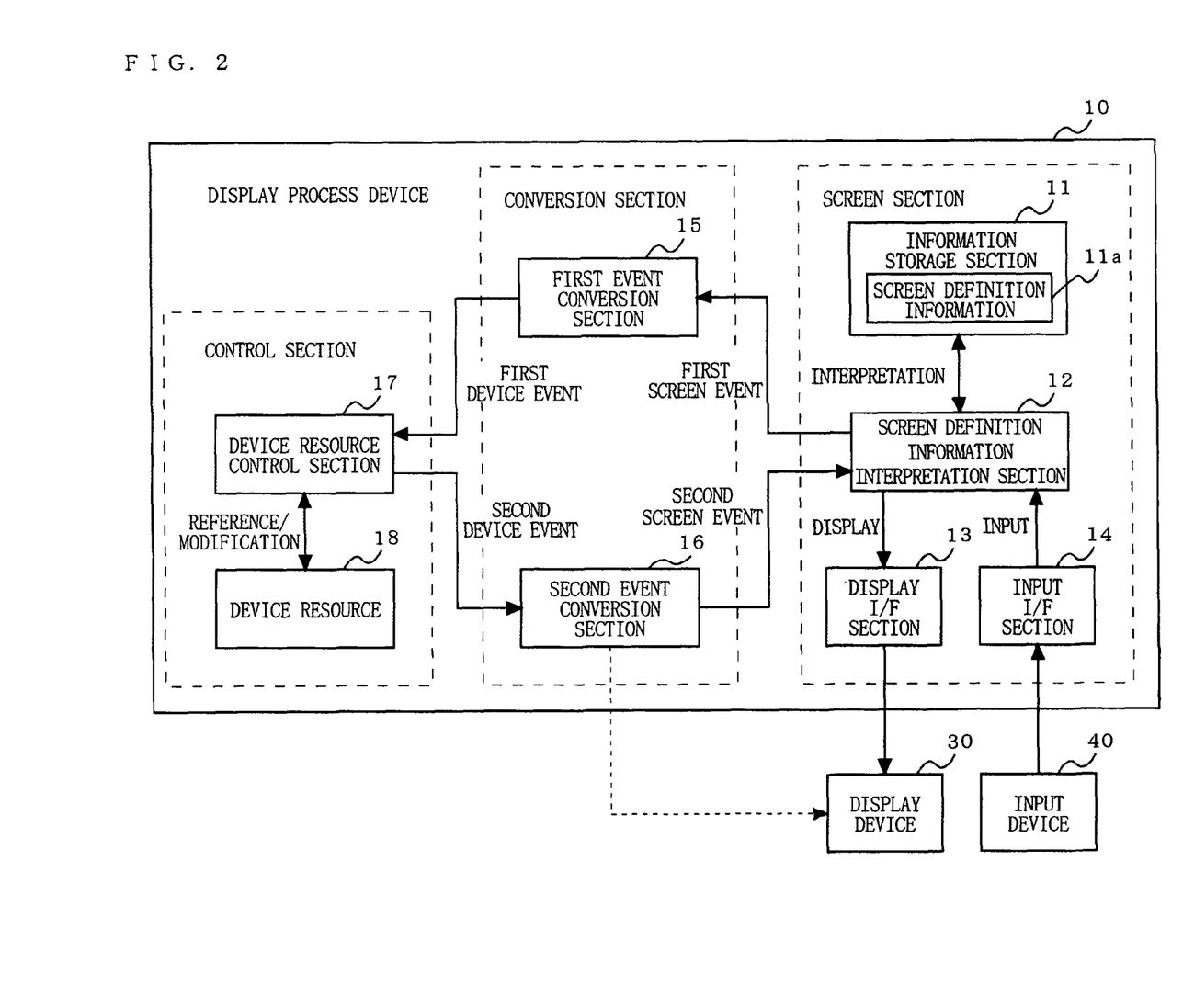
FIG. 2 is a block diagram showing an example of a configuration of a display process device 10 according to a first embodiment of the present invention.

FIG. 2 is a block diagram showing an example of a configuration of the display process device 10 according to a first embodiment of the present invention. In FIG. 2, the display process device 10 according to the first embodiment comprises, for a screen section, an information storage section 11, a screen definition information interpretation section 12, a display interface section (display I/F section) 13, and an input interface section (input I/F section) 14; for a conversion section, a first event conversion section 15, and a second event conversion section 16; and for a control section, a device resource control section 17, and a device resource 18. Further, the display process section 10 is connected to an external display device 30 via a display interface section 13, also to an external input device 40 via an input interface section 14.

A display process device 10 is normally realized in a form of an application (or a software which executes the application), which involves a screen display on the external display device 30. For the application, a WEB browser application, a mail application, a word processor application, a camera application, a launcher application, a file management application, a telephone book application, an image edit application, or the like, which requires relevant information to be displayed on the display device 30, may be suitable. Also, a telephone application, a music application, or the like which requires a user interface display, which is used solely for the purpose of operating the application, may be suitable as well. Needless to say, the display process device 10 may be realized in a form of hardware. When the display process device 10 is realized in a form of hardware, the display device 30 and the input device 40 may be included in the internal configuration therein.

The information storage section 11 stores screen definition information 11a, which defines a moment in which the first screen event is to be issued. In the screen definition information 11a, a screen, which is to be displayed on the display device 30, an action, which corresponds to an instruction displayed in the screen inputted via the input interface section 14, and an outgoing instruction are described. The outgoing instruction means an access instruction (e.g., an instruction to start another application, a utilization instruction regarding a specific function retained by another application, or an instruction for a guidance display) for having an access to a resource on the apparatus. Also, the screen definition information 11a, which may be a content for displaying a two-dimensional image, a content for displaying a three-dimensional image such as a Flash content, or a content described in XML, corresponds to a GUI content. When the screen definition information 11a is a Flash content, a URL is issued as a first screen event at an appropriate time. Also, the screen definition information 11a may be updateable. For the current description, an example in which screen definition information 11a is stored in the information storage section 11, which is an internal storage device of RAM, ROM, or the like, is shown. However, the screen definition information 11a may be obtained from an external storage device such as a hard disc drive, or obtained via an external network.

The screen definition information interpretation section 12 interprets the screen definition information 11a, and generates, based on the result of the interpretation executed by the screen definition information interpretation section 12, a screen to be displayed on the display device 30. The screen definition information interpretation section 12 requests the display interface section 13 to display the generated screen. Also, the screen definition information interpretation section 12 modifies the displayed screen with respect to the instruction inputted by the input interface section 14, and issues a first screen event based on the screen definition information 11a, which corresponds to the screen which is being displayed. The issued first screen event is given to the first event conversion section 15. The screen definition information interpretation section 12, which may be a player for reproducing a two-dimensional content, a player for reproducing a three-dimensional content, such as Flash player, or a player for reproducing a content described in XML, corresponds to the GUI player.

The display interface section 13 causes the display section 30 to display the screen when requested by the screen definition information interpretation section 12. The input interface section 14 gives to the screen definition information interpretation section 12 an instruction, which is coming from either a user or a resource retained by the display process device 10. The instruction from the user is given via an input device 40 such as keyboard, a mouse, or a remote control. Also, the instruction from the resource retained by the display process device 10 is given via another application, or a timer. The instruction from another application may be given by a wired communication, or a wireless communication from an external apparatus.

The first event conversion section 15 converts a first screen event, which is given by the screen definition information interpretation section 12, to a first device event, which may be interpreted by the device resource control section 17, and gives the first device event to the device resource control section 17. When the screen definition information 11a is a Flash content, since the first screen event is an URL, the first event conversion section 15 decomposes the URL, and converts the URL to the first device event, which may be interpreted by the device resource control section 17. In the first device event, there is a description of information, or the like, for starting another application which is operable in an apparatus, for using a function retained by another application, or for modifying a display of a key guidance letting the user, who is operating the apparatus, know a next action.

If the first device event having described thereon an instruction to make a reference to or to modify the device resource 18 is given to the device resource control section 17, the device resource control section 17 controls the device resource 18 in accordance with the instruction. Also, the device resource control section 17 issues the second device event having described thereon a description of the result of the referencing or the modification of the device resource 18, and gives the second device event to the second event conversion section 16.

The device resource 18 is a resource (e.g., another application, hardware, or a database) retained by the display process device 10.

The second event conversion section 16 converts the second device event, which is given thereto by the device resource control section 17, to the second screen event, which may be interpreted by the screen definition information interpretation section 12, and gives the second screen event to the screen definition information interpretation section 12. When the screen definition information 11a is a Flash content, the converted second screen event becomes the information for operating an object in the Flash content. The second event conversion section 16 can convert the second device event to a screen which is to be displayed on the display device 30, and directly outputs the screen to the display device 30 (see a path indicated by a dotted line with an arrow in FIG. 2).

A characteristic display process method, which is executed by the display process device 10 according to the first embodiment having the configuration described above, will be described with reference to FIGS.

Figure 3:
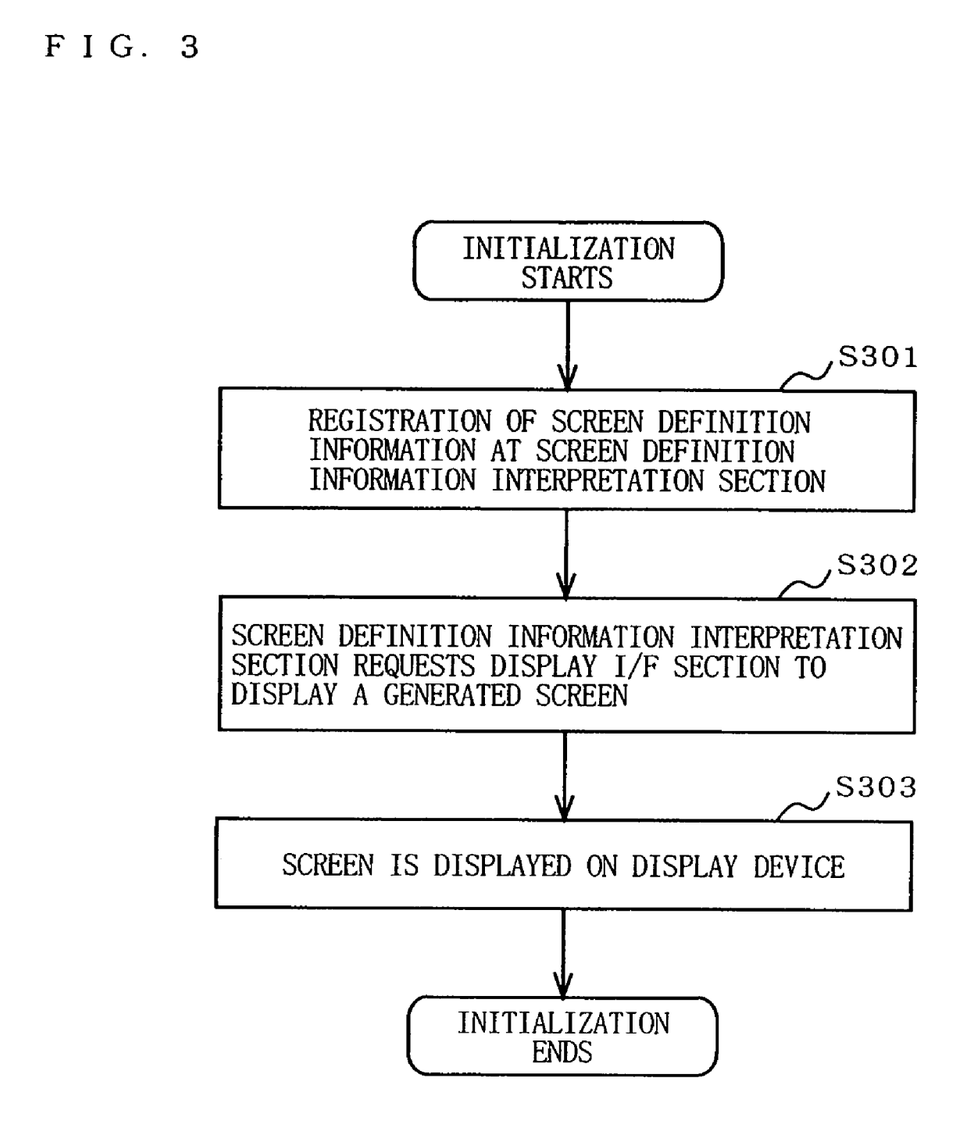
FIG. 3 is a diagram showing an example of a flowchart for an initialization executed in the display process device 10.
Figure 4:
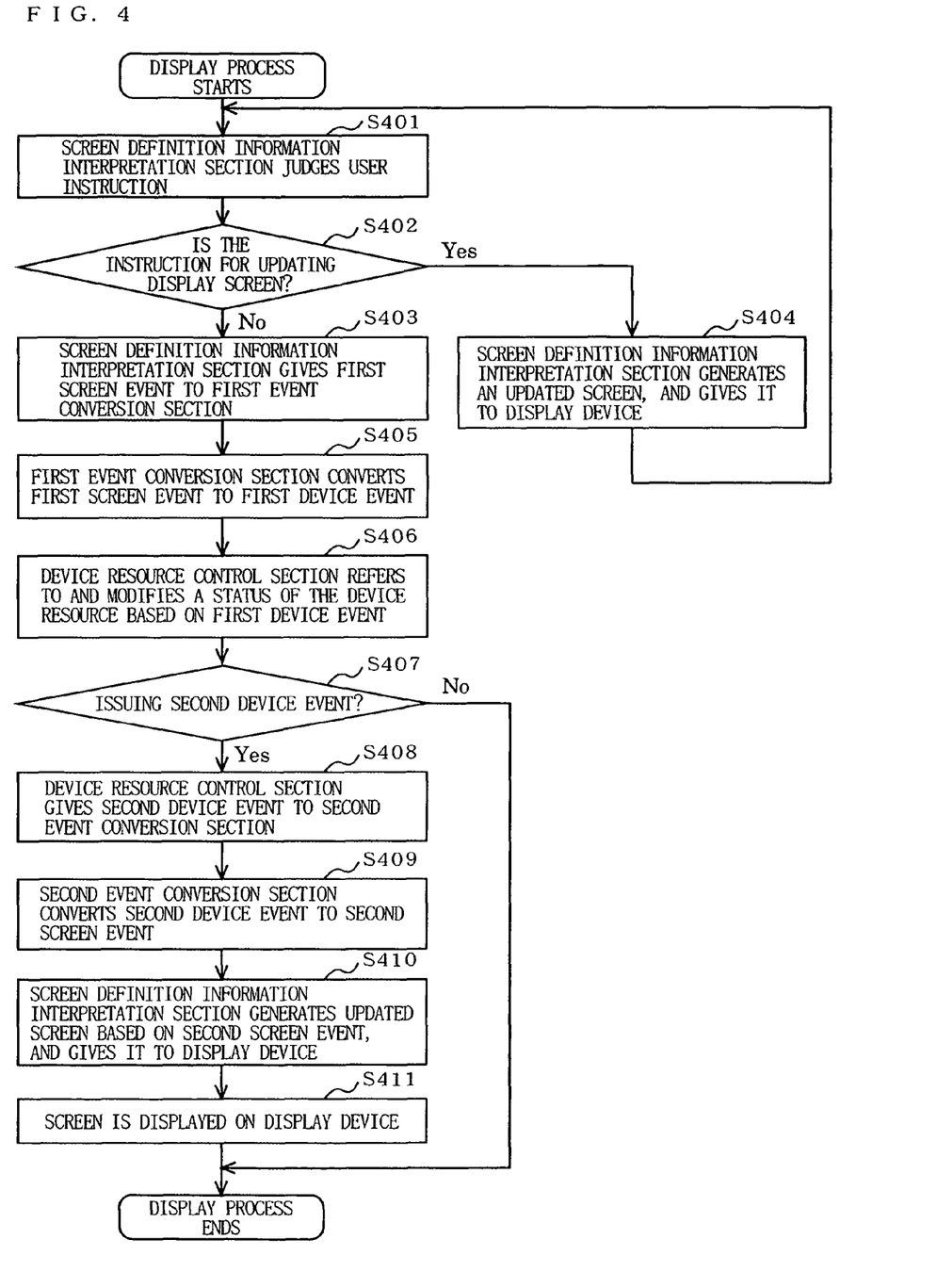
FIG. 4 is a diagram showing an example of a flowchart for a display process executed in the display process device 10.
Figure 5A:
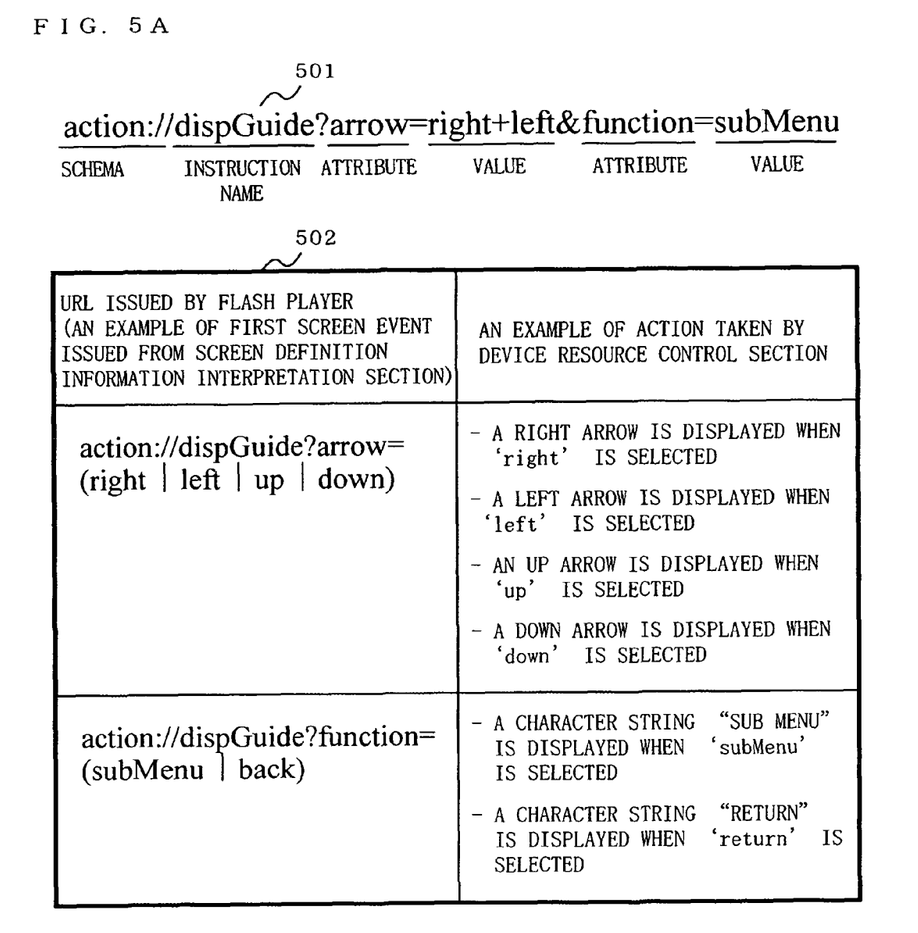
FIG. 5A is a diagram showing an example of a format for a first screen event.
Figure 5B:
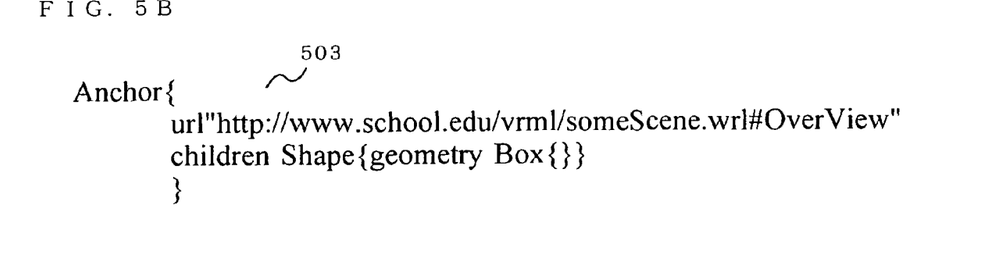

FIG. 3 is a diagram showing an example of a flowchart for an initialization executed by the display process device 10. FIG. 4 is a diagram showing an example of the flowchart for a display process executed by the display process device 10. FIG. 5A and FIG. 5B each are a diagram showing an example of a format for the first screen event.

At first, with reference to FIG. 3, an initialization sequence executed by the display process device 10 will be described.

The initialization sequence is started when; the power is initially supplied to an apparatus having therein the display process device 10; a specific application is started; or a user explicitly instructs the initialization sequence to start. First, the screen definition information 11a is registered at the screen definition information interpretation section 12 (step S301). What is meant by registration is to determine a GUI content, which will be an object to be displayed, and further to determine a screen to be displayed. Next, the screen definition information interpretation section 12 interprets the registered screen definition information 11a, requests the display interface section 13 to display the generated screen (step S302). Then, when the display interface section 13 causes the display device 30 to display the requested screen, the initialization process ends (step S303).

After the aforementioned initialization process, the display process device 10 causes the display device 30 to display the screen which is generated based on the content of the GUI content, and will be in a standby mode to wait for an instruction such as an input from the user or a notification from a timer. When the display process device 10 receives some type of an instruction, a following display process sequence will be executed by the display process device 10.

With reference to FIG. 4, a display process sequence, which is to be executed by the display process device 10 after the aforementioned initialization process ends, will be described.

The screen definition information interpretation section 12 determines, after receiving an instruction from the user via the input interface section 14, a content of the received instruction (step S401). When the instruction is for, based on the determination, updating the screen which is being displayed on the display device 30 (following the "YES" path from step S402), the screen definition information interpretation section 12 generates an updated screen, and gives the updated screen of the display device 30 to the display interface section 13 (step S404). On the other hand, when the instruction is for, based on the determination, issuing a first screen event (following the "No" path from step S402), the screen definition information interpretation section 12 gives the first screen event to the first event conversion section 15 (step S403).

The first event conversion section 15 converts the first screen event, which is given thereto, to the first device event, and gives the first device event to the device resource control section 17 (step S405). The device resource control section 17, based on the given first device event, refers to or modifies a status of the device resource 18 (step S406). Also, the device resource control section 17 determines whether or not to issue a second device event (step S407). When the device resource control section 17 determines to issue the second device event (following the "YES" path from step S407), the device resource control section 17 gives the second device event to the second event conversion section 16 (step S408). On the other hand, when the device resource control section 17 determines not to issue the second device event (following the "No" path from step S407), the device resource control section 17 ends the process.

The second event conversion section 16 converts the second device event, which is given thereto, to the second screen event, and gives the second screen event to the screen definition information interpretation section 12 (step S409). The screen definition information interpretation section 12 generates a screen based on the given second screen event, and gives the screen to the display interface section 13 (step S410). The display interface section 13 causes the display device 30 to display the new screen in accordance with the screen given thereto by the screen definition information interpretation section 12 (step S411). Note that the second event conversion section 16 can directly output to the display device 30 a display request of the screen, which is generated based on the second device event.

Although FIG. 4 shows a case in which the display process sequence is started when the input device 40 gives an instruction (step S401), the timing in which the display process sequence is started is not limited thereto. For example, it may be set such that the display process sequence is started when the device resource control section 17 voluntarily issues the second device event (step S407).

Next, with reference to FIG. 5A, the display process sequence will be described into detail by using an example in which a Flash player is used as the screen definition information interpretation section 12.

When the Flash player is used as the screen definition information interpretation section 12, a URL is used as the first screen event. The URL is defined by RFC2396. Also, a Flash content is used as the screen definition information 11a. A first screen event 501 shown in FIG. 5A is an example of a first screen event issued by the Flash player. The first screen event 501 has "action://" as a schema. Also, instead of a host name of a URL, an instruction name is used. A query for the instruction name is conjoined by using "?". As for the attribute to be described in the query, a plurality of values may be described; when a plurality of values are to be described for one attribute, they are conjoined by using "+". When the plurality of attributes are to be described for one instruction name, they are conjoined by using "&".

An example of an action taken by the device resource control section 17 with respect to the first screen event issued by the Flash player is shown in a table 502. As indicated in the table 502, since an instruction for the device resource control section 17 is described in advance, the first screen event is converted, by the first event conversion section 15, to the first device event, which may be interpreted by the device resource control section 17, and a resource, which is originally inaccessible from the Flash player, may become accessible. The patterns shown in the table 502 may be increased or decreased depending on the correspondence status of the device resource control section 17.

Besides the aforementioned Flash player, a VRML (Virtual Reality Modeling Language) player, in which the first screen event 411 is described in a format as shown in FIG. 5B, may be utilized as the screen definition interpretation section 12. According to the VRML, a selected page may be displayed by a click, of a mouse, on a Box in a three-dimensional space, which is described in FIG. 5B.

Figure 6A:
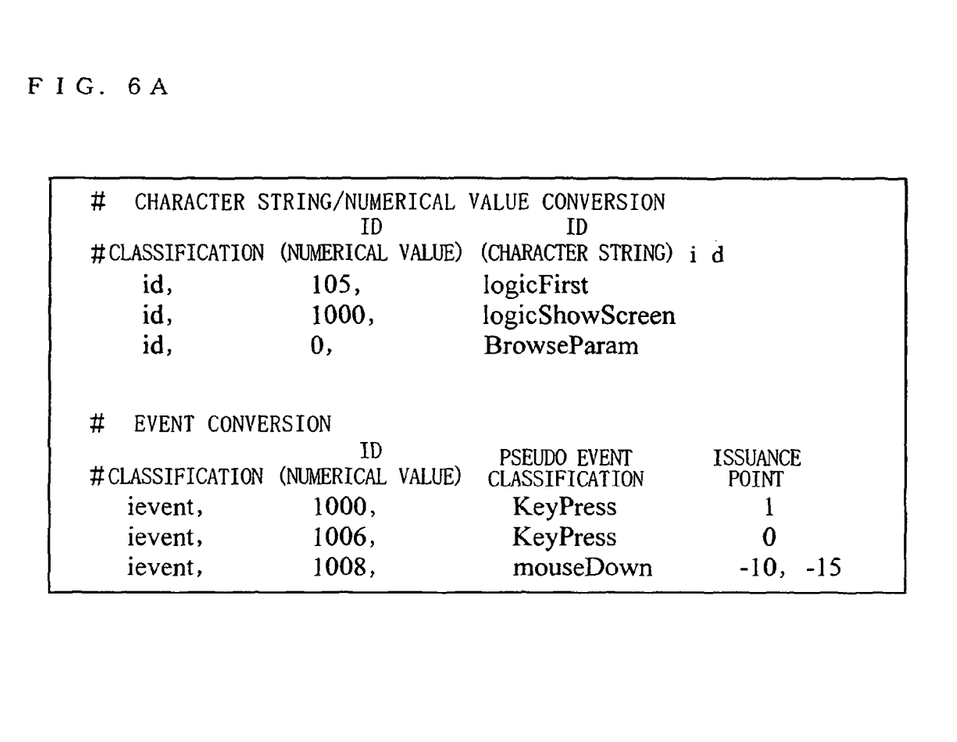
FIG. 6A is a diagram showing an example of a resource file.
Figure 6B:
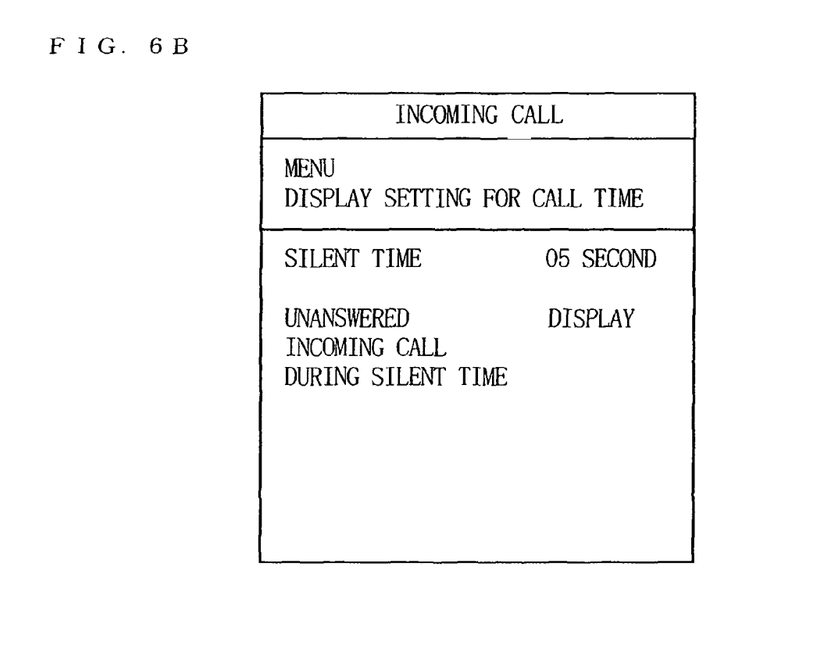
FIG. 6B is a diagram showing an example of a content screen displayed in a display device 30.

Further, with reference to FIGS. 6A, 6B, and 7, a display process according to the present invention will be described into detail by using an example of an application which utilizes a Flash content.

A mobile phone application, which acquires a call time upon receiving an incoming call, and displays the call time as a content, will be described as an example. FIG. 6A is an example of a resource file. FIG. 6B is a diagram showing an example of a content screen displayed in the display device 30. FIG. 7 is a diagram showing in detail an example of a process sequence taken by the aforementioned application.

Figure 7:
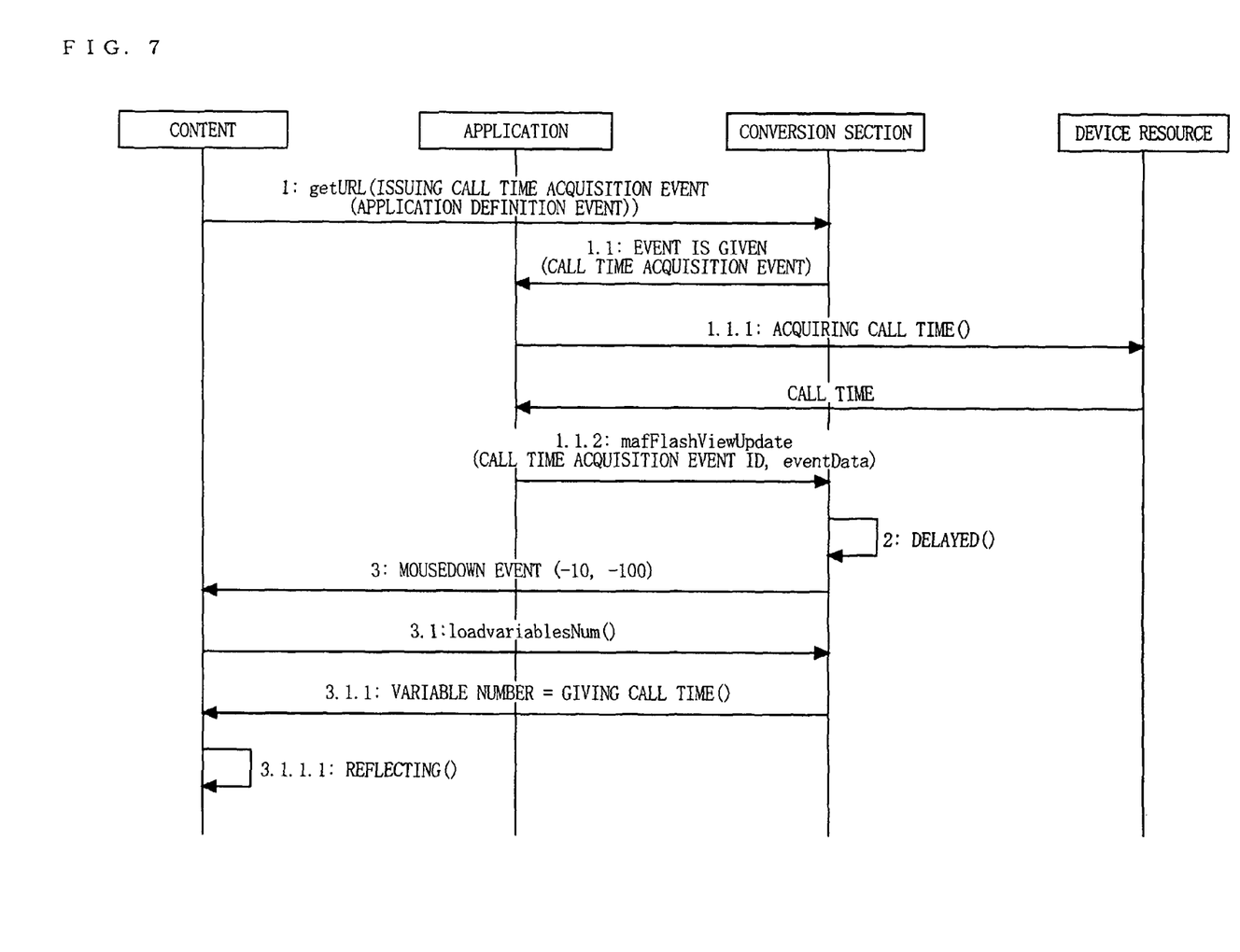
FIG. 7 is a diagram showing of a process sequence for a specific application.

In FIG. 7, at first, a call time acquisition event issuance (getURL(action://getCallTime)) is provided from a content (display section) to a conversion section (1). Next, the call time acquisition event is given from the conversion section to an application (control section) (1.1). Next, the application requests to a device resource an acquisition of the call time (1.1.1). In response to the request, the device resource replies to the application with the call time. Then, an association between an event ID, which will be used as an argument, and an event for a content issuance is described in a resource file (FIG. 6A) (1.1.2). Next, the conversion section issues a mousedown event, which is a false event (3). In response to the issuance, the content issues a loadVariablesNum( ) (3.1). Then, the conversion section, in response to the issuance, gives to the content the call time as a variable (3.1.1). The content reflects the call time given thereto on the content (3.1.1.1). By this, the acquired call time will be written in a spot for a silent time on the content screen which is shown in FIG. 6B.

A mousedown point, at which the aforementioned mousedown event is issued, needs to be pre-programmed into the content. The loadVariablesNum( ), which is a method for writing information in a content, needs to be pre-mounted on the mousedown point. Also, a variable for storing information for each mousedown point, need to be maintained on the side of the content. In general, the mousedown event is used so as to allow an interactive operation between a user and a content when the user clicks on a mouse, however, in this embodiment, the mousedown event is used as a mechanism for an application to deliver information to a content when the conversion section issues to a mousedown point, which is located in a position not reachable from the user, an event, which comes from the application, as a mousedown event, which is a false event.

Figure 8:
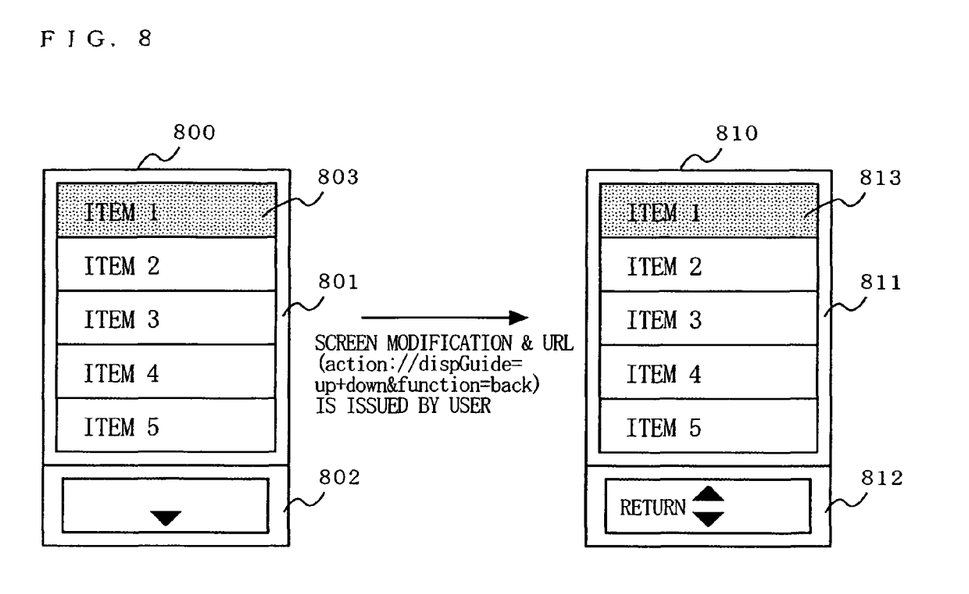
FIG. 8 is a diagram showing an example of a content screen being displayed in a display device 30.

Further, FIG. 8 is a diagram showing an example in which, when a menu screen is being displayed by utilizing a Flash player as the screen definition information interpretation section 12, and a screen, displayed therein, is transformed from a display screen 800 to a display screen 810.

The display screens 800 and 810 are screens to be displayed on the display device 30. The display screens 800 and 810 each comprise a menu screen and a guidance screen. Menu screens 801 and 811 are screen generated by the Flash player. Guidance screens 802 and 812, wherein guidance information is displayed, are device resource 18 which is managed by the device resource control section 17. Selection items 803 and 813 each indicate an item which is currently being selected from among a plurality of items, wherein the item becomes identifiable when a focus is given thereto in the menu screen 801. If a user instruction is inputted via the input interface section 14 while the display screen 800 is being displayed, the display screen 800 is transitioned to the display screen 810. The Flash player executes a process for transferring the menu screen 801 to the menu screen 811, and a process for transferring the selection item 803 to the selection 813. Further, when the menu screen 801 is transitioned to the menu screen 811, a first screen event is to be issued in a form of URL.

In FIG. 8, as the first screen event, "action:// dispGuide=up+down&function=back" is issued. The issued first screen event is described based on a rule for generating events shown in the table 502 in FIG. 5A. The issued first screen event is converted by the first event conversion section 15 to a first device event, which may be interpreted by the device resource control section 17, and is given to the device resource control section 17. In accordance with the rule for generating events as shown in the table 502, the device resource control section 17 modifies the guidance screen. In the present example, "an arrow pointing up/downward" and "return" are shown in the guidance display screen 812.

A second event conversion section 16 gives an instruction to the screen definition information interpretation section 12, and modifies the screen which is to be displayed by converting a device event that has been given thereto. When the screen definition information 11a is a Flash content, the converted second screen event will become a piece of information required for operating an object in the Flash content. Also, the screen to be displayed may be modified when a display request is directly issued from the second event conversion section 16 to the display device 30.

As described above, due to the display process device and the method thereof according to the first embodiment of the present invention, in the field of application development, it becomes possible for a GUI content and a GUI player which are generated and developed, respectively, for another system to realize GUI of an application, which is under development, and for the GUI player to have an access to a resource of an apparatus having therein the GUI player.

(Second Embodiment)

Figure 9:
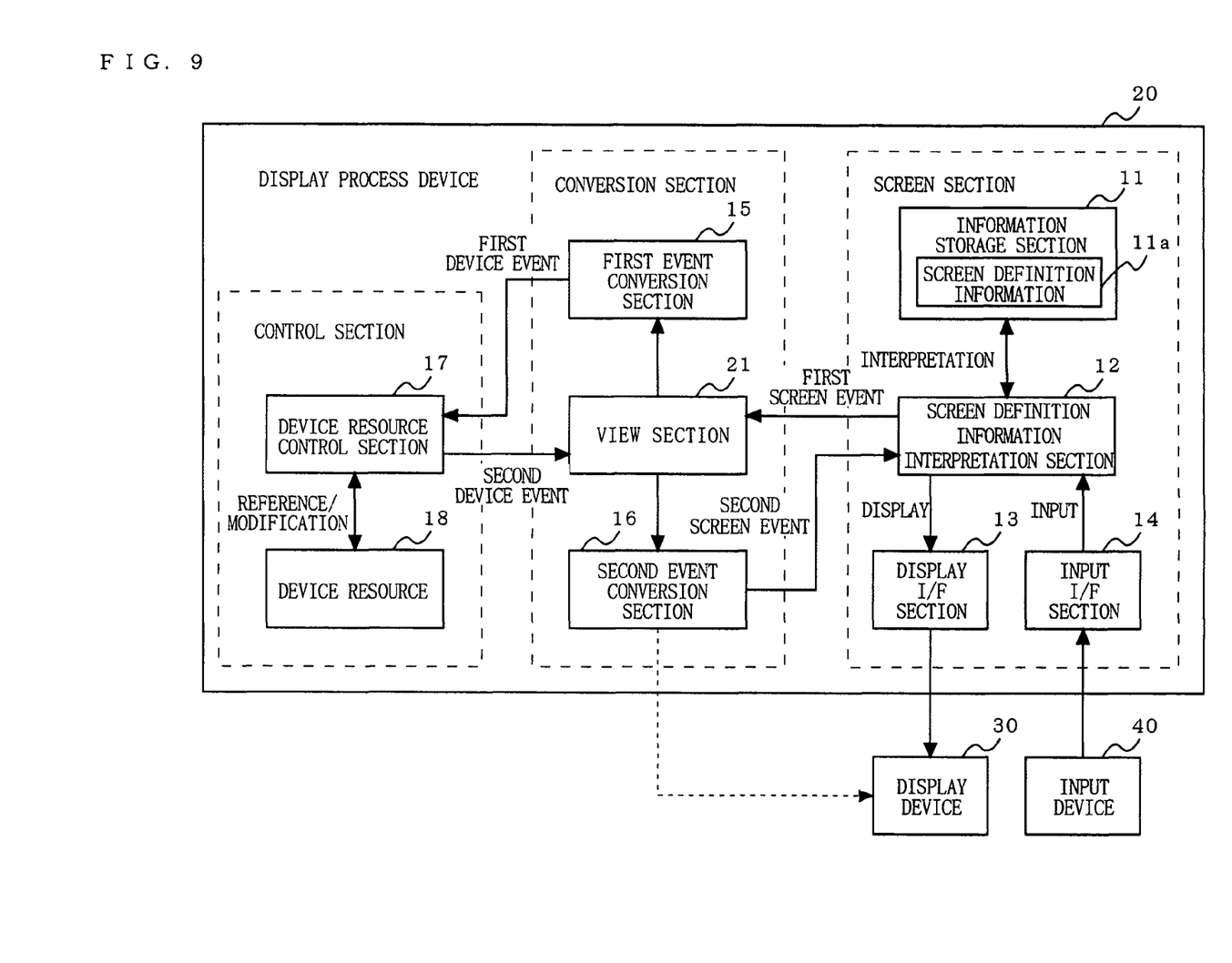
FIG. 9 is a block diagram showing an example of a configuration of a display process device 20 according to a second embodiment of the present invention.

FIG. 9 is a block diagram showing an example of a configuration of a display process device 20 according to a second embodiment of the present invention. In FIG. 9, the display process device 20 according to the second embodiment comprises, for a screen section, an information storage section 11, a screen definition information interpretation section 12, a display interface section 13, and an interface section 14; for a conversion section, a first event conversion section 15, a second event conversion section 16, and a view section 21; and for a control section, a device resource control section 17, and a device resource 18.

As shown in FIG. 9, the display process device 20 according to the second embodiment has a configuration in which the view section 21 is further added to the display process device 10 according to the first embodiment. The view section 21 functions as a mediator for information communication conducted between the first screen event and the second device event, and manages a registration of the first event conversion section 15 and the second event conversion section 16. Hereinafter, the display process device 20 according to the second embodiment will be described with particular attention paid to the view section 21. Note that for configurations and steps executing the same actions described in the first embodiment are denoted by the same reference marks as those used therein.

The screen definition information interpretation section 12 gives to the view section 21 a first screen event, which is issued based on screen definition information 11a. The view section 21 gives to the first event conversion section 15 the first screen event that is given thereto by the screen definition information interpretation section 12. The first event conversion section 15 converts the first screen event, which is given thereto by the view section 21, to a first device event, and gives the first device event to the device resource control section 17.

Further, the device resource control section 17 issues and gives a second device event to the view section 21. The view section 21 gives to the second event conversion section 16 the second device event which is given thereto by the device resource control section 17. The second event conversion section 16 converts the second device event, which is given thereto by the view section 21, to the second screen event, and gives the second screen event to the screen definition information interpretation section 12.

A characteristic method for a display process executed by the display process device 20 according to the second embodiment will be described with reference to FIG.

Figure 10:
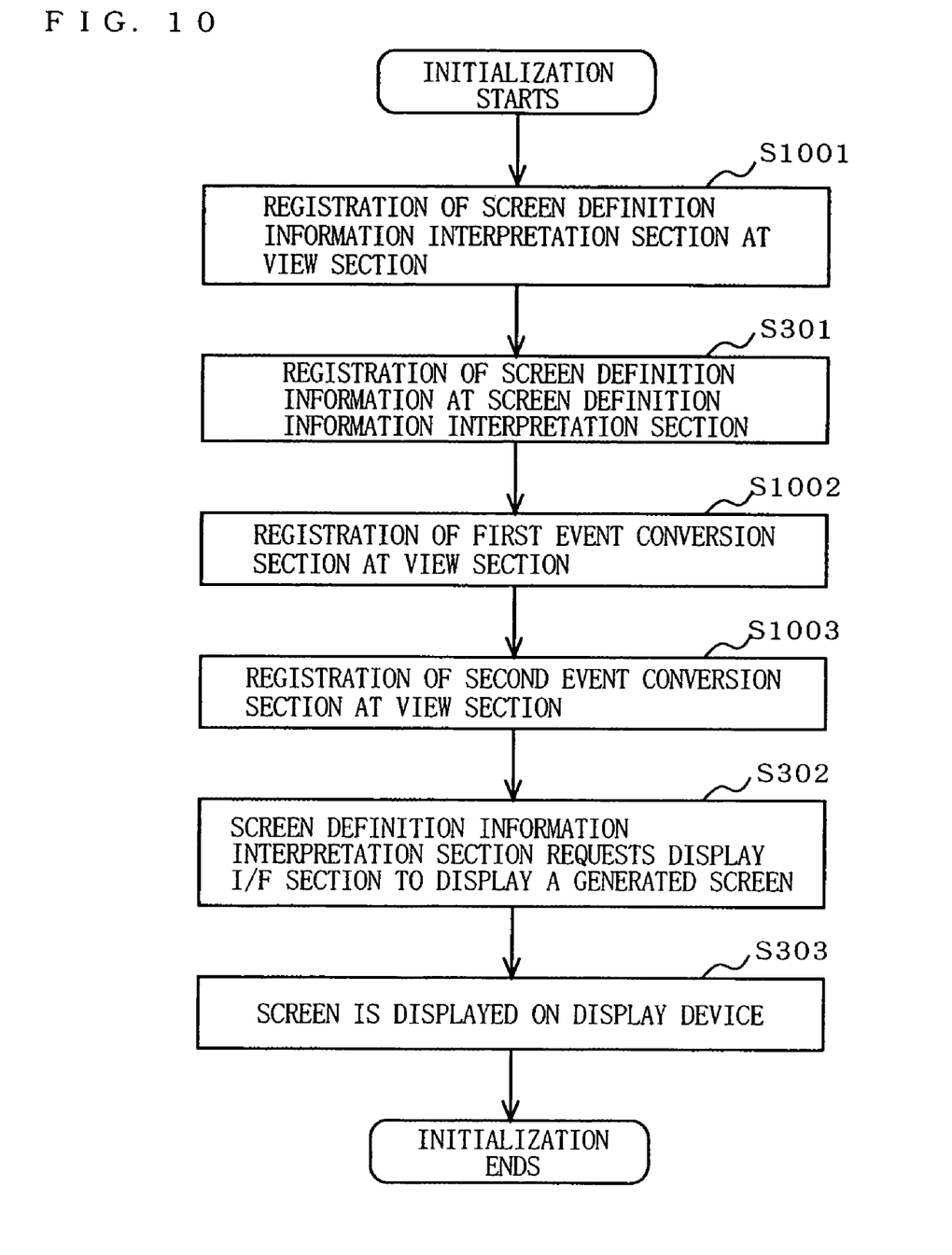
FIG. 10 is a diagram showing an example of a flowchart for an initialization executed in a display process device 20.

FIG. 10 is a diagram showing an example of an initialization sequence executed by the display process device 20. In FIG. 10, at first, the screen definition information interpretation section 12 is registered at the view section 21 (step S1001). This setting is to plug in a GUI player so that a GUI content may be reproduced. Next, the screen definition information 11a is registered at the screen definition information interpretation section 12 (step S301). Then, the first event conversion section 15 and the second event conversion section 16 are registered at the view section 21 (steps S1002 and S1003). Finally, the screen definition information interpretation section 12 interprets the screen definition information 11a, which is registered in the step S301, and requests the display interface section 13 to display the generated screen (step S302). Then, when the display interface section 13 causes the display device 30 to display the requested screen, the initialization process ends (step S303).

Figure 11:
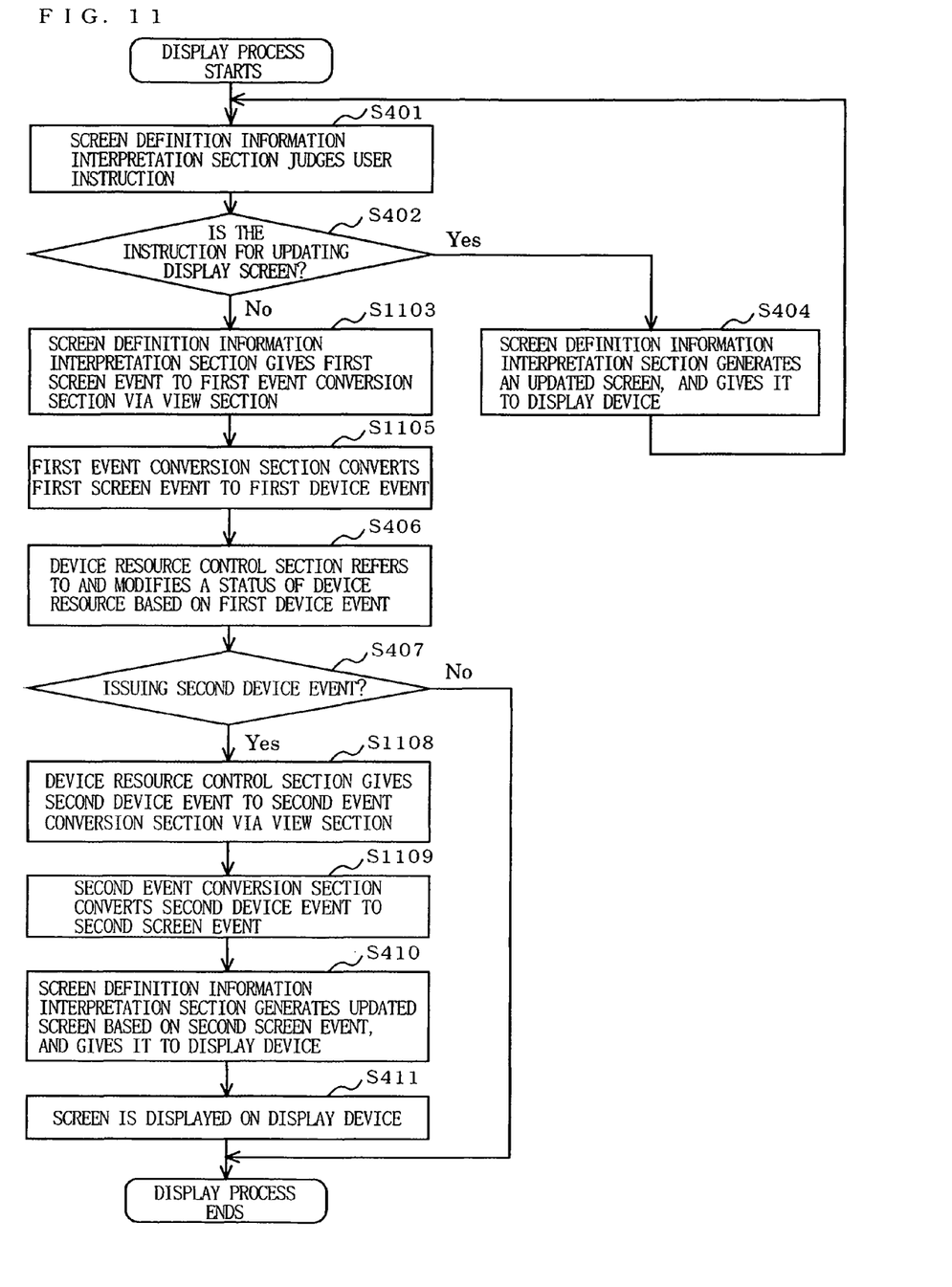
FIG. 11 is a diagram showing an example of a flowchart for a display process executed in a display process device 20.

FIG. 11 is a diagram for describing a display process sequence executed by the display process device 20 after the aforementioned initialization process ends. In FIG. 11, when the screen definition information interpretation section 12 determines that an instruction, which is given thereto via the input interface section 14, is an instruction for issuing a first screen event (following the "NO" path from step S402), the screen definition information interpretation section 12 gives the first screen event to the first event conversion section 15 via the view section 21 (step S1103). The first event conversion section 15 converts the first screen event, which is given thereto from the view section 21, to the first device event, and gives the first device event to the device resource control section 17 (step S1105). Also, the device resource control section 17, upon determining to issue a second device event (following the "YES" path from step S407), gives the second device event to the second event conversion section 16 via the view section 21 (step S1108). The second event conversion section 16 converts the second device event which is given thereto from the view section 21 to a second screen event, and gives the second screen event to the screen definition information interpretation section 12 (step S1109).

According to the display process device 20, the view section 21 manages the screen definition information interpretation section 12, the first event conversion section 15 and the second event conversion section 16. That is, the screen definition information interpretation section 12, the first event conversion section 15, and the second event conversion section 16 may all be updated freely by a method such as downloading through the view section 21. By updating the screen definition information interpretation section 12, it becomes possible to modify a GUI player, which plays a GUI content. By updating the first event conversion section 15, it becomes possible to modify an instruction, which is given to the device resource control section 17. By updating the second event conversion section 16, it becomes possible to modify an action taken by the screen definition information interpretation section 12 with respect to the instruction given by the device resource control section 17.

As described above, due to the display process device and the method thereof according to the second embodiment of the present invention, in the field of application development, it becomes possible for a GUI content and a GUI player, which are generated and developed, respectively, for another system, to realize a GUI of an application that is under development, and for the GUI player to have an access to a resource on an apparatus having therein the GUI player.

Further, updating the GUI content and the GUI player allows a GUI of an application, which is under development, to be modified without modifying the application. By this, reusability of the existing application will be improved, thereby realizing an improvement in efficiency of application development, and a reduction of a cost of the application development.

A display process device of the present invention is useful in a situation in which a GUI content and a GUI player, which are generated and developed, respectively, to fulfill a specific purpose, are used as GUI for an application, and the like. The display process device of the present invention is particularly useful as an application framework, or the like, for freely modifying a GUI of an application which is pre-installed in an apparatus. Further, the display process device of the present invention may be applied not only for the pre-installed application in the apparatus, but also for an application of a personal computer (PC).

The invention claimed is:

1. A display process apparatus comprising:
an application;
a device resource which is another application;
a display screen;
a GUI player configured to reproduce and display, on said display screen, a GUI content used by said application; and
a conversion section configured to, by using a conversion rule, convert from a-screen event information for the display of the GUI content displayed on said display screen by said GUI player into device event information that is interpretable for said device resource, the conversion rule associating the screen event information related to the GUI content with the device event information interpretable for said device resource,
wherein the device resource reports, to said application, a result of an interpretation executed based on the device event information converted by said conversion section,
the application processes the screen event information related to said GUI player in accordance with the result of interpretation reported from said device resource, and the conversion section changes the conversion rule in accordance with said GUI player used by the display process apparatus, to allow various GUI players to access said device resource.

2. The display process apparatus according to claim 1, wherein
the display process apparatus obtains another conversion rule and another GUI player that is allowed to access said device resource by using the other conversion rule, and updates the conversion rule to the other conversion rule that has been obtained, and modifies said GUI player to the other GUI player that has been obtained.

3. The display process apparatus according to claim 2, wherein
the display process apparatus obtains the other GUI player and the other conversion rule via a network.

4. A display process method for displaying on a display screen, the display process method comprising:
converting, by using a conversion rule, from screen event information for the display of a GUI content, which is used by an application and is reproduced and displayed on the display screen by a GUI player, into device event information interpretable for a device resource which is another application other than the application using the GUI content the conversion rule associating the screen event information related to the GUI content with the device event information interpretable for the device resource and being changed in accordance with the used GUI player; and
causing the application to process the screen event information related to the GUI content displayed on the display screen by the GUI player on the basis of a result obtained by the device resource executing the device event information converted by said conversion step,
wherein said conversion step changes the conversion rule in accordance with the GUI player used by the display process method, to allow various GUI players to access the device resource.

5. A computer-readable program stored on a non-transitory computer-readable storage medium for causing a display process apparatus to execute a display process method which causes a display screen to be displayed, the computer-readable program causing the display process apparatus to execute:
converting, by using a conversion rule, from screen event information related to a GUI content, which is used by an application and is reproduced and displayed on the display screen by a GUI player, into device event information interpretable for a device resource which is another application other than the application using the GUI content, the conversion rule associating the screen event information related to the GUI content with the device event information interpretable for the device resource and being changed in accordance with the used GUI player; and
causing the application to process the screen event information related to the GUI content displayed on the display screen by the GUI player on the basis of a result obtained by the device resource executing the device event information converted by said conversion step,
wherein said conversion step changes the conversion rule in accordance with the GUI player used by the display process method, to allow various GUI players to access the device resource.

* * * * *

UNITED STATES PATENT AND TRADEMARK OFFICE
CERTIFICATE OF CORRECTION

| | | |
|---|---|---|
| PATENT NO. | : 8,140,999 B2 | Page 1 of 1 |
| APPLICATION NO. | : 10/590339 | |
| DATED | : March 20, 2012 | |
| INVENTOR(S) | : Hidehiko Shin et al. | |

It is certified that error appears in the above-identified patent and that said Letters Patent is hereby corrected as shown below:

TITLE PAGE

In Section (22), "Filed: Aug. 23, 2006" should read -- PCT Filed: Mar. 22, 2005 --.

Please insert the following missing information:

Section -- (86) PCT No.: PCT/JP2005/005097

§ 371 (c)(1), (2), (4) Date: Aug. 23, 2006. --.

and

Section -- (87) PCT Pub. No.: WO2005/093565

PCT Pub. Date: Oct. 6, 2005. --.

Signed and Sealed this
Seventh Day of August, 2012

David J. Kappos
*Director of the United States Patent and Trademark Office*